United States Patent [19]

Bartholomew et al.

[11] Patent Number: 4,660,894
[45] Date of Patent: Apr. 28, 1987

[54] PROPORTIONING BRAKE VALVE WITH DUAL AREA SECONDARY PISTON

[75] Inventors: Roy E. Bartholomew, Elyria; Milan J. Sebo, Lorain, both of Ohio

[73] Assignee: Allied Corporation, Morristown, N.J.

[21] Appl. No.: 848,015

[22] Filed: Apr. 3, 1986

[51] Int. Cl.[4] .............................................. B60T 15/12
[52] U.S. Cl. ................................ 303/54; 303/7; 303/40
[58] Field of Search ............ 303/6 R, 7, 40, 50, 303/52, 54, 56

[56] References Cited

U.S. PATENT DOCUMENTS

| | | |
|---|---|---|
| 2,985,489 | 5/1961 | Stelzer . |
| 3,413,042 | 11/1968 | Herold . |
| 3,504,698 | 4/1970 | Frill . |
| 3,637,054 | 1/1972 | Billeter . |
| 3,730,597 | 5/1973 | Pickert . |
| 4,230,373 | 10/1980 | Plantan ......................................... 303/7 |
| 4,261,624 | 4/1981 | Plantan ......................................... 303/7 |
| 4,383,717 | 5/1983 | Bueler ......................................... 303/7 |
| 4,387,933 | 6/1983 | Cripe . |
| 4,453,779 | 6/1984 | Bridigum . |
| 4,498,712 | 2/1985 | Hart . |
| 4,530,544 | 7/1985 | Joseph . |
| 4,553,789 | 11/1985 | Pugh et al. ................................... 303/54 |

Primary Examiner—Duane A. Reger
Attorney, Agent, or Firm—Ken C. Decker; William N. Antonis

[57] ABSTRACT

A dual circuit brake valve includes a relay piston (50) having primary (82) and secondary (84) areas which are normally communicated to the pressure level at the primary outlet or delivery port (18). The relay piston (50) responds to a pressure differential across the relay piston to control communication to the secondary outlet or delivery port (22). A control mechanism (92) is responsive to a control signal to vent the secondary area (84) to thereby establish a differential area across the relay piston (50), so that the relay piston (50) will establish a pressure level at the secondary outlet or delivery port (22) which is a predetermined fraction of the pressure level at the primary outlet or delivery port (18).

15 Claims, 2 Drawing Figures

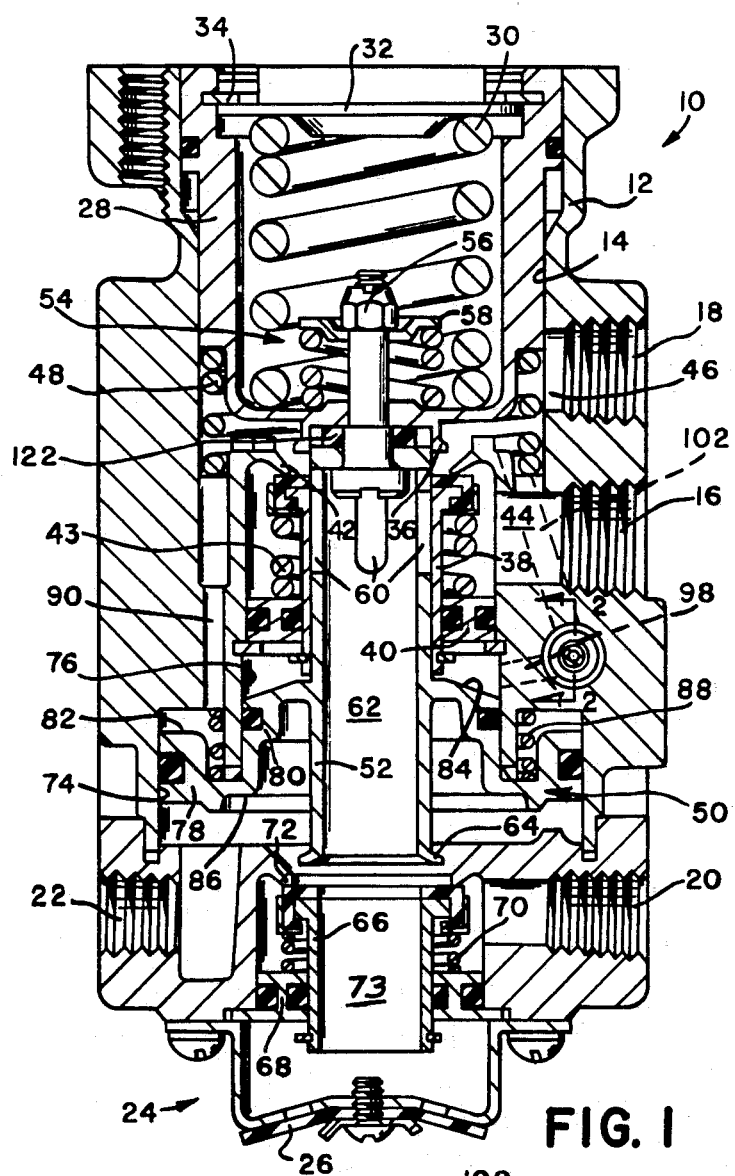
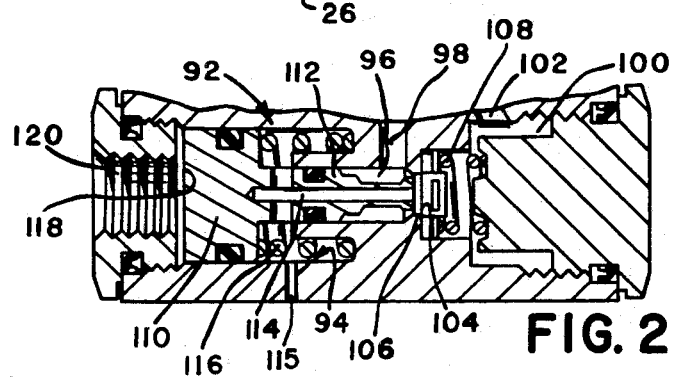
FIG. 1
FIG. 2

PROPORTIONING BRAKE VALVE WITH DUAL AREA SECONDARY PISTON

This invention relates to a dual circuit brake valve for a heavy duty vehicle.

Dual circuit brake valves are used to control communication through the primary and secondary braking circuits of a heavy duty vehicle. Typically, the brake valve is responsive to movement of an operator-actuated treadle to substantially simultaneously control communication between a pair of supply or inlet ports to a corresponding pair of outlet or delivery ports. Such prior art valves typically communicate substantially the same pressure levels to each of the corresponding outlet ports. Such brake valves, when used on a tractor which is capable of pulling a loaded trailer, are desirably equipped to communicate the same pressure levels to both outlet or delivery ports when a loaded trailer is connected to the tractor. However, when the tractor is operated in the so-called "bobtail" mode, that is, without a trailer, the rear wheel brakes of the tractor are severely overbraked. Accordingly, a dangerous skidding condition can result, and it is desirable to provide a mechanism which automatically reduces braking pressure communicated to the tractor rear wheel brakes when the tractor is operated without a trailer. Such prior art brake valves which communicate substantially the same pressure levels under all circumstances to the outlet ports thereof are illustrated in U.S. Pat. No. 3,580,646. Recently issued U.S. Pat. No. 4,553,789 discloses a brake control valve in which proportioning in the secondary circuit is effected when the tractor is operated without a trailer, thereby reducing the pressure level communicated to the rear wheel brakes of the tractor.

The present invention provides a dual circuit brake valve of the type disclosed in the aforementioned U.S. Pat. No. 3,580,646 in which the relay piston which controls communication between the secondary inlet and the secondary outlet is divided into a primary and a secondary area. A control device is responsive to a pressure signal (normally the connection between the tractor and the trailer supply line) to vent the secondary area when the tractor is being operated in the bobtail mode, but which communicates both the primary and secondary areas to the primary outlet when the tractor is being operated with a trailer. Accordingly, communication between the secondary inlet and secondary outlet is proportioned when the trailer is operated in the bobtail mode to thereby generate a pressure level at the secondary outlet which is a predetermined ratio of the pressure level at the primary outlet. Accordingly, the reduced pressure level reduces the braking effect of the rear wheel brakes of the tractor when the tractor is operated without a trailer, thereby making skidding less likely.

These and other advantages of the invention will become apparent from the following description, with reference to the accompanying drawings, in which:

FIG. 1 is a cross sectional view of a dual circuit brake valve made pursuant to the teachings of the present invention; and FIG. 2 is an enlarged cross sectional view taken substantially along lines 2—2 of FIG. 1.

Referring now to the drawing, a dual circuit brake valve generally indicated by the numeral 10 includes a housing 12 defining a bore 14 therewithin. A primary inlet port 16, a primary outlet or delivery port 18, a secondary inlet port 20 and a secondary outlet or delivery port 22 communicate with the bore 14. An exhaust port generally indicated by the numeral 24 also communicates with the bore 14 and is closed by a conventional flapper valve 26 that permits communication from the bore 14 to the atmosphere, but prevents communication in the reverse direction.

A graduating piston 28 is slidably mounted in the bore 14 and carries a graduating spring 30, which will be described in detail hereinafter. The graduating spring 30 urges a treadle plate 32 into engagement with a stop ring 34 carried by the piston 28. The treadle plate 32 is engaged by the operator-actuated brake treadle, which is conventionally mounted in the vehicle operator's compartment. A circumferentially extending valve operating member 36 circumscribes the piston 28 and is adapted to engage a valve plunger generally indicated by the numeral 38 when the graduating piston 28 is forced downwardly (viewing FIG. 1) during a brake application. Plunger 38 is guided by circumferential sealing member 40 which is mounted in the bore 14, and is urged into sealing engagement with a circumferentially extending valve seat 42 mounted in the bore 14 by a spring 43. Accordingly, the valve seat 42 and plunger 38 divide the bore 14 into a primary inlet chamber 44 which is communicated to the primary inlet port 16 and a primary outlet chamber 46 which is communicated to the primary outlet or delivery port 18. A spring 48 yieldably urges the graduating piston 28 upwardly viewing the Figure, toward the position illustrated in the drawing.

A relay piston generally indicated by the numeral 50 is slidably mounted in the bore 14 and includes a stem 52 which is slidably received within the valve plunger 38. The stem is tied to the graduating piston 28 by a caged spring assembly generally indicated by the numeral 54 which includes a fastener assembly 56 and a spring 58. The stem 52 is provided with elongated slots 60 so that when the various components of the valve assembly 10 are disposed in the positions illustrated, the outlet chamber 46 can communicate with exhaust port 24 through the slots 60 and the passage 62 defined within the stem 52. The stem 52 terminates in a valve-operating member 64, which is adapted to operate a valve plunger 66 slidably mounted within the lower portion of the bore 14 viewing the Figure by a sealing assembly 68. Spring 70 yieldably urges valve plunger 66 into sealing engagement with a valve seat 72. As can be seen in FIG. 1, when the valve-operating member 64 is disposed away from the valve plunger 66, the pressure at the secondary delivery port 22 is vented to the exhaust port 24 through passage 73 defined within the valve plunger 66.

The lower portion of the bore 14 is stepped to define a larger diameter portion 74 and a smaller diameter portion 76. The relay piston 50 is similarly stepped to define a larger diameter portion 78 which is sealingly and slidably engaged with the larger diameter portion 74 of the bore 14 and a smaller diameter portion 80 which is slidably and sealingly engaged with the smaller diameter portion 76 of the bore 14. Accordingly, the upper face (viewing FIG. 1) of the relay piston 50 is divided into a primary area 82 and a secondary effective area 84. Primary area 82 is defined by the difference between the larger diameter portion 78 of the relay piston and the smaller diameter portion 80 of the relay piston 50, and the secondary effective area 84 is defined by the smaller diameter portion 80 of relay piston 50.

The effective area 86 on the opposite side of the piston 50 is exposed to the fluid pressure level at the secondary outlet or delivery port 22. A spring 88 yieldably urges the relay piston 50 downwardly viewing the Figure. A passage 90 communicates the primary effective area 82 of the relay piston 50 with the primary outlet or delivery chamber 46.

Referring now to FIG. 2, the valve 10 includes a control mechanism generally indicated by the numeral 92 and includes a bore 94, a portion 96 of which is communicated to the secondary effective area 84 of piston 50 through a passage 98 (indicated by dashed lines in FIG. 1). Another portion 100 of the bore 94 is communicated with the primary outlet or delivery chamber 46 by a passage 102 (indicated by the dashed lines in FIG. 1). Portion 100 of bore 94 is separated from portion 96 by a valve member 104 which is urged into sealing engagement with valve seat 106 by a spring 108. A plunger 110 is slidably mounted in bore 94 and includes a stem 112 for engagement with the valve member 104. A passage 114 within the plunger 110 communicates portion 96 with the exterior of the valve housing via passage 115 when the plunger 110 is disposed in the postion illustrated in FIG. 2. A spring 116 yieldably urges the plunger 110 into the position illustrated. The face 118 of plunger 110 is exposed to the fluid pressure level at a control port 120. Control port 120 is communicated to an appropriate control pressure source. In the present invention, it is preferred that the control port 120 be communicated to the connection between the tractor protection valve and the trailer supply line. Accordingly, when the tractor on which the valve 10 is mounted is connected to pull a trailer, the trailer supply line will be connected to the trailer braking system, and a pressure level will be communicated through the trailer supply line. Therefore, a pressure signal will also be communicated to the control port 120. On the other hand, if the tractor is operated in the aforementioned bobtail mode in which the tractor is not pulling a trailer, the trailer supply line will not be connected to the trailer braking system and, accordingly, the trailer supply line will be at atmospheric pressure, so that the pressure level at control port 120 will also be at substantially atmospheric pressure.

In operation, and assuming that the tractor and trailer are connected, the pressure signal communicated to control port 120 urges the plunger 110 to the right viewing FIG. 2, thereby bringing the stem 96 into sealing engagement with valve member 104 to thereby terminate communication to the atmosphere through exhaust passages 114 and 115. Additional movement of plunger 110 urges the valve member 104 away from seat 106, thereby communicating the portion 96 with the portion 100 of the bore 94, to thereby communicate passage 98 with passage 102. Accordingly, the outlet or delivery chamber 46 is communicated both with the primary area 82 (through passage 90) and with the secondary area 84 (through passages 98 and 102) of the relay piston 50.

The valve 10 can then be operated as described in the aforementioned U.S. Pat. No. 3,580,646. In summary, a brake application is effected by downward movement of the graduating piston 28 by the vehicle operator, to first bring secondary valve-operating member 64 into sealing engagement with plunger 66 to thereby terminate communication between the delivery or outlet port 22 and the exhaust port 24. Further downward movement of the graduating piston 28 an additional increment collapses the collapsible resilient member 122 to thereby bring valve-operating member 36 into sealing engagement with valve plunger 38. The relative movement of the plunger 28 with respect to the stem 52 also collapses the spring 58, thereby relieving the force thereof from the stem 52. Accordingly, the force of spring 88, which is less than that of spring 70, partially relieves the force of spring 70 holding the plunger 66 against valve seat 72. Additional downward movement of the plunger 28 cracks open the valve plunger 38, thereby permitting communication from the primary inlet port 16 to the primary outlet or delivery port 18 through the primary outlet or delivery chamber 46 to effect a brake application.

At the same time, the pressure in the primary outlet or delivery chamber 46 is communicated to the primary and secondary effective areas 82, 84 of the relay piston 50 through passage 90 and through passages 102 and 98. Accordingly, fluid pressure acting against the aforementioned primary and secondary effective areas 82, 84 urges the relay piston 50 downwardly, thereby cracking open the valve plunger 66 from valve seat 72 to permit communication from the secondary inlet 20 to the secondary outlet or delivery port 22 to effect a brake application. However, as soon as pressure builds up in the system, the pressure acting against the graduating piston 28 will urge the graduating piston upwardly, collapsing the graduating spring 30, thus returning the valve members 36, 64 to the lapped position in which the valve operating members 36, 64 engage their corresponding valve members 38, 66, while the latter remain in sealing engagement with their corresponding valve seats 42, 72. Unless the operator changes the pressure on the treadle, the valve members will remain in this lapped position. It will be noted that the pressure effected at the secondary outlet or delivery port 22 is substantially the same as that effected at the primary outlet or delivery port 18, since the face 86 of the primary piston 50 is exposed to the pressure at the outlet or delivery port 22 is substantially the same as the combined areas of the primary and secondary effective areas 82, 84, the piston 50 is not returned to the lapped position until substantially equal fluid pressure levels exist across the relay piston 50.

If the vehicle is operated in the aforementioned bobtail mode, pressure at control port 120 is vented as described hereinabove. Accordingly, spring 116 urges the piston 110 to the left viewing FIG. 2, thereby bringing the end of the stem 112 away from the valve member 104, permitting the spring 108 to urge the valve member 104 into sealing engagement with the valve seat 106. Accordingly, communication between the passages 98, 102 is terminated, and the passage 98 is vented to atmosphere through passages 114 and 115. Accordingly, the secondary effective area 84 of the relay piston 50 will be vented to atmosphere regardless of the position of the valve members. When a brake application is effected as described hereinabove, the pressure communicated to primary effective area 82 of relay piston 50 will still be that of the primary delivery or outlet chamber 46 because of the connection therebetween by the passage 90. However, the secondary effective area 84 will be vented to atmosphere. Therefore, a lower pressure will be created at the secondary delivery port 22, since the pressure at delivery port 22 acts against the entire face 86 of piston 50, while the pressure in primary delivery or outlet port 46 acts only against the primary effective area 82. Since the primary effective area 82 is some predetermined ratio of the area 86, the pressure level communicated to secondary delivery port 22 will be some predetermined fraction of the pressure level in primary delivery or outlet chamber 46. Accordingly, a reduced or proportioned rear brake application is effected through the delivery or outlet port 22, since the pressure level communicated through the secondary delivery outlet port 22 is some predetermined fraction of the pressure level communicated through the primary delivery or outlet port 18.

We claim:

1. Dual circuit brake valve comprising a housing having a pair of inlets, pair of outlets, and an exhaust, said housing defining a bore therewithin, a first set of cooperating valve members in said bore and adapted to control communication between said exhaust, one of said inlets, and a corresponding one of said outlets, a second set of cooperating valve members mounted in said bore and adapted to control communication between said exhaust, the other inlet, and the other outlet, an operator-actuated plunger slidable in said bore for operating said first set of valve members, a relay piston slidably mounted in said bore for operating said second set of valve members, said relay piston having a primary area and a secondary area, means communicating said primary area to said one outlet, and control means shiftable from a first condition communicating said secondary area with said one outlet regardless of the pressure level at said one outlet, said control means being shiftable to a second condition venting said secondary area regardless of the pressure level at said one outlet.

2. Dual circuit brake valve as claimed in claim 1, wherein said relay piston defines a fluid pressure responsive area communicated with the fluid pressure at said other outlet.

3. Dual circuit brake valve as claimed in claim 2, wherein said fluid pressure responsive area is substantially equal to the sum of said primary and secondary areas, the fluid pressure at said other outlet acting against said fluid pressure responsive area generating a force acting on said relay piston opposing the force acting on said relay piston generated by fluid pressure acting against said primary and secondary areas.

4. Dual circuit brake valve as claimed in claim 3, wherein venting of said secondary effective area by said control means causes an area differential across said relay piston wherein the pressure level at said other outlet is established at a predetermined ratio of the pressure level at said one outlet, said predetermined ratio being the ratio of said primary effective area to said fluid pressure responsive area.

5. Dual circuit brake valve as claimed in claim 1, wherein said control means includes a control port for communication with a fluid pressure control signal, pressure responsive means responsive to the fluid pressure at said control port, valve mechanism operable by said pressure responsive means to control communication between said secondary area and the fluid pressure level communicated to said one outlet and between said secondary area and atmosphere.

6. Dual circuit brake valve as claimed in claim 1, wherein said relay piston is stepped to define larger and smaller sections with a shoulder therebetween, said bore being correspondingly stepped to define a larger diameter portion slidably receiving the larger portion of the relay piston and a smaller diameter portion receiving the smaller portion of the relay piston.

7. Dual circuit brake valve as claimed in claim 6, wherein the shoulder of the piston is sealingly engaged with the shoulder on the housing.

8. Dual circuit brake valve as claimed in claim 6, wherein said control means includes a control port for communication with a fluid pressure signal, pressure responsive means responsive to the fluid pressure level at said control port for shifting in response to said control signal from a first position communicating said secondary area to the one outlet, said pressure responsive area being shiftable in response to said control signal to a second position venting said secondary area.

9. Dual circuit brake valve comprising a housing having a pair of inlets, a pair of outlets, and an exhaust, said housing defining a bore therewithin, a first set of cooperating valve members in said bore and adapted to control communication between said exhaust, one of said inlets, and a corresponding one of said outlets, a second set of cooperating valve members mounted in said bore and adapted to control communication between said exhaust, the other inlet, and the other outlet, an operator-actuated plunger slidable in said bore for operating said first set of valve members, a relay piston slidably mounted in said bore for operating said second set of valve members, said relay piston having a pair of effective area, one of said effective areas being communicated to said one outlet and the other effective area being communicated to said other outlet, said relay piston including means for operating said second set of valve members to control the fluid pressure level at said other outlet as a function of the fluid pressure level at said one outlet, and control means shiftable from a first condition causing the pressures acting on said effective area to be substantially equal to a second condition causing the pressure level communicated to said other effective area to be proportionally less than the fluid pressure level communicated to said one effective area.

10. Dual circuit brake valve as claimed in claim 9, wherein said control means varies the size of one of said effective areas as the control valve means shifts from said first condition to said second condition.

11. Dual circuit brake valve as claimed in claim 9, wherein said control means creates a differential area across said relay piston as said control means from said first condition to said second condition.

12. Dual circuit brake valve as claimed in claim 10, wherein said one effective area of said relay piston includes a primary area and a secondary area, said control means in said first condition communicating both said primary area and said secondary area to said one outlet and in said second condition communicating only said primary area to said one outlet and venting said secondary area.

13. Control valve as claimed in claim 12, wherein said control means includes a control port for communication with a fluid pressure signal, pressure responsive means responsive to the fluid pressure level at said control port for shifting in response to said control signal from a first position communicating said secondary effective area to the one delivery port, said pressure responsive area being shiftable in response to said control signal to a second position venting said secondary effective area.

14. Control valve as claimed in claim 12, wherein said relay piston is stepped to define larger and smaller sections with a shoulder therebetween, said bore being correspondingly stepped to define a larger diameter portion slidably receiving the larger portion of the piston and a smaller diameter portion receiving the smaller portion of the piston.

15. Control valve as claimed in claim 14, wherein the shoulder of the piston is sealingly engaged with the shoulder on the housing, said secondary area being that portion of the piston radially outward of the shoulder, said primary area being defined within said shoulder.

* * * * *